United States Patent
Ye et al.

(10) Patent No.: US 12,323,357 B2
(45) Date of Patent: Jun. 3, 2025

(54) DMRS OVERHEAD ADAPTATION WITH AI-BASED CHANNEL ESTIMATION

(71) Applicant: APPLE INC., Cupertino, CA (US)

(72) Inventors: Sigen Ye, San Diego, CA (US); Chunhai Yao, Beijing (CN); Chunxuan Ye, San Diego, CA (US); Dawei Zhang, Saratoga, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/904,413

(22) PCT Filed: Sep. 24, 2021

(86) PCT No.: PCT/CN2021/120067
§ 371 (c)(1),
(2) Date: Aug. 17, 2022

(87) PCT Pub. No.: WO2023/044696
PCT Pub. Date: Mar. 30, 2023

(65) Prior Publication Data
US 2024/0235767 A1    Jul. 11, 2024

(51) Int. Cl.
*H04L 5/00* (2006.01)
*H04L 25/02* (2006.01)
(Continued)

(52) U.S. Cl.
CPC ........ *H04L 5/0051* (2013.01); *H04L 25/0254* (2013.01); *H04W 72/1273* (2013.01); *H04W 72/232* (2023.01)

(58) Field of Classification Search
CPC ............ H04L 5/0051; H04L 25/0254; H04W 72/1273; H04W 72/232; G06N 3/09
See application file for complete search history.

(56) References Cited

U.S. PATENT DOCUMENTS

| | | |
|---|---|---|
| 2020/0313741 A1 | 10/2020 | Zhu et al. |
| 2020/0366537 A1 | 11/2020 | Wang et al. |

(Continued)

FOREIGN PATENT DOCUMENTS

CN    109379120 A    2/2019

OTHER PUBLICATIONS

Ericsson , "Joint Channel Estimation for Pusch", R1-2105654, 3GPP TSG-RAN WG1 Meeting #105-e, e-Meeting, Agenda Item 8.8.1.3, May 10-27, 2021, 17 pages.

(Continued)

*Primary Examiner* — Deepa Belur
(74) *Attorney, Agent, or Firm* — Dorsey & Whitney LLP

(57) ABSTRACT

The present disclosure relates to DMRS overhead adaptation with AI-based channel estimation. A wireless device may be configured to receive, from a network device, a downlink data transmitted using a DMRS pattern; perform an AI-based downlink channel estimation based on the downlink data, including: inputting one or more received downlink DMRS symbols included in the received downlink data to a neural network model for downlink channel estimation stored in the memory of the wireless device, to obtain, as outputs of the neural network model, an estimated downlink channel corresponding to the downlink data and an optimal downlink DMRS pattern for the estimated downlink channel; and report the optimal downlink DMRS pattern to the network device.

20 Claims, 6 Drawing Sheets

(51) Int. Cl.
*H04W 72/1273* (2023.01)
*H04W 72/232* (2023.01)

(56) References Cited

U.S. PATENT DOCUMENTS

| | | | |
|---|---|---|---|
| 2021/0064996 A1* | 3/2021 | Wang | H04L 1/0016 |
| 2021/0266950 A1 | 8/2021 | Namgoong et al. | |
| 2022/0123885 A1* | 4/2022 | Shin | H04W 72/0446 |
| 2022/0346132 A1* | 10/2022 | Shen | G06N 20/00 |
| 2023/0082053 A1* | 3/2023 | Jeon | H04L 25/0224 |
| | | | 370/252 |
| 2024/0097853 A1* | 3/2024 | Wu | H04B 1/525 |
| 2024/0296382 A1* | 9/2024 | Wang | G06N 5/022 |
| 2024/0313999 A1* | 9/2024 | Portnik | H04L 25/0224 |
| 2024/0396766 A1* | 11/2024 | Jeong | G06N 3/0475 |
| 2025/0038918 A1* | 1/2025 | Mu | H04L 5/00 |

OTHER PUBLICATIONS

PCT/CN2021/120067, International Search Report and Written Opinion, Jun. 20, 2022, 9 pages.

* cited by examiner (a)  (b)

(c)  (d)

DMRS OVERHEAD ADAPTATION WITH AI-BASED CHANNEL ESTIMATION

TECHNICAL FIELD

This application relates generally to wireless communication systems, including a wireless device and a network device for demodulation reference signal (DMRS) overhead adaptation with artificial intelligence (AI)-based channel estimation.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as ag Node B or gNB).

A RAN provides its communication services with external entities through its connection to a core network (CN). For example, E-UTRAN may utilize an Evolved Packet Core (EPC), while NG-RAN may utilize a 5G Core Network (5GC).

SUMMARY

A demodulation reference signal (DMRS) may be used for channel estimation and demodulation. In particular, DMRS symbols with specific patterns may be carried by a resource block and transmitted from a transmitter to a receiver. The receiver may use the received DMRS symbols with a specific pattern, which is known by the receiver in advance, for estimating the channel.

Recently, artificial intelligence (AI) for air interface is getting more and more attention. One possible improvement may be DMRS overhead adaptation with AI-based channel estimation. The DMRS overhead (e.g., the ratio of the DMRS symbols and the total data transmitted) determined by the DMRS pattern may have an impact on the channel estimation performance. By using AI-based channel estimation, better performances may be achieved for DMRS overhead adaptation and/or channel estimation. However, the procedures/mechanisms to support DMRS overhead adaptation with AI-based estimation are still under discussion.

Embodiments in the present disclosure relate to devices and methods for DMRS overhead adaptation with AI-based estimation.

A wireless device according to some embodiments of the present disclosure may be configured to receive, from a network device, a downlink data transmitted using a downlink demodulation reference signal (DMRS) pattern; perform an artificial intelligence (AI)-based downlink channel estimation based on the downlink data, including: inputting one or more received downlink DMRS symbols included in the received downlink data to a neural network model for downlink channel estimation stored in the memory of the wireless device, to obtain, as outputs of the neural network model, an estimated downlink channel corresponding to the downlink data and an optimal downlink DMRS pattern for the estimated downlink channel; and report the optimal downlink DMRS pattern to the network device.

A network device according to some embodiments of the present disclosure may be configured to configure a wireless device to enable an artificial intelligence (AI)-based downlink channel estimation; and receive, from the wireless device, an optimal downlink DMRS pattern which is output from a neural network model used for the AI-based downlink channel estimation, wherein the neural network model has an input of downlink DMRS symbols included in a downlink data received by the wireless device and outputs of estimated downlink channel corresponding to the downlink data and an optimal downlink DMRS pattern for the estimated downlink channel.

A network device according to some embodiments of the present disclosure may be configured to receive, from a wireless device, an uplink data transmitted using an uplink demodulation reference signal (DMRS) pattern; perform an artificial intelligence (AI)-based uplink channel estimation based on the uplink data, including: inputting one or more received uplink DMRS symbols included in the received uplink data to a neural network model for uplink channel estimation stored in the memory of the network device, to obtain, as outputs of the neural network model, an estimated uplink channel corresponding to the uplink data and an optimal uplink DMRS pattern for the estimated uplink channel; and indicate the wireless device to use the optimal uplink DMRS pattern for uplink transmission.

A method for a wireless device according to some embodiments of the present disclosure may comprise receiving, from a network device, a downlink data transmitted using a downlink demodulation reference signal (DMRS) pattern; performing an artificial intelligence (AI)-based downlink channel estimation based on the downlink data, including: inputting one or more received downlink DMRS symbols included in the received downlink data to a neural network model for downlink channel estimation, to obtain, as outputs of the neural network model, an estimated downlink channel corresponding to the downlink data and an optimal downlink DMRS pattern for the estimated downlink channel; and reporting the optimal downlink DMRS pattern to the network device.

A method for a network device according to some embodiments of the present disclosure may comprise configuring a wireless device to enable an artificial intelligence (AI)-based downlink channel estimation; and receiving, from the wireless device, an optimal downlink DMRS pattern which is output from a neural network model used for the AI-based downlink channel estimation, wherein the neural network model has an input of downlink DMRS symbols included in a downlink data received by the wireless device and outputs of estimated downlink channel corresponding to the downlink data and an optimal downlink DMRS pattern for the estimated downlink channel.

A method for a network device according to some embodiments of the present disclosure may comprise receiving, from a wireless device, an uplink data transmitted using an uplink demodulation reference signal (DMRS) pattern; performing an artificial intelligence (AI)-based uplink channel estimation based on the uplink data, including: inputting one or more received uplink DMRS symbols included in the received uplink data to a neural network model for uplink channel estimation, to obtain, as outputs of the neural network model, an estimated uplink channel corresponding to the uplink data and an optimal uplink DMRS pattern for the estimated uplink channel; indicating the wireless device to use the optimal uplink DMRS pattern for uplink transmission.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
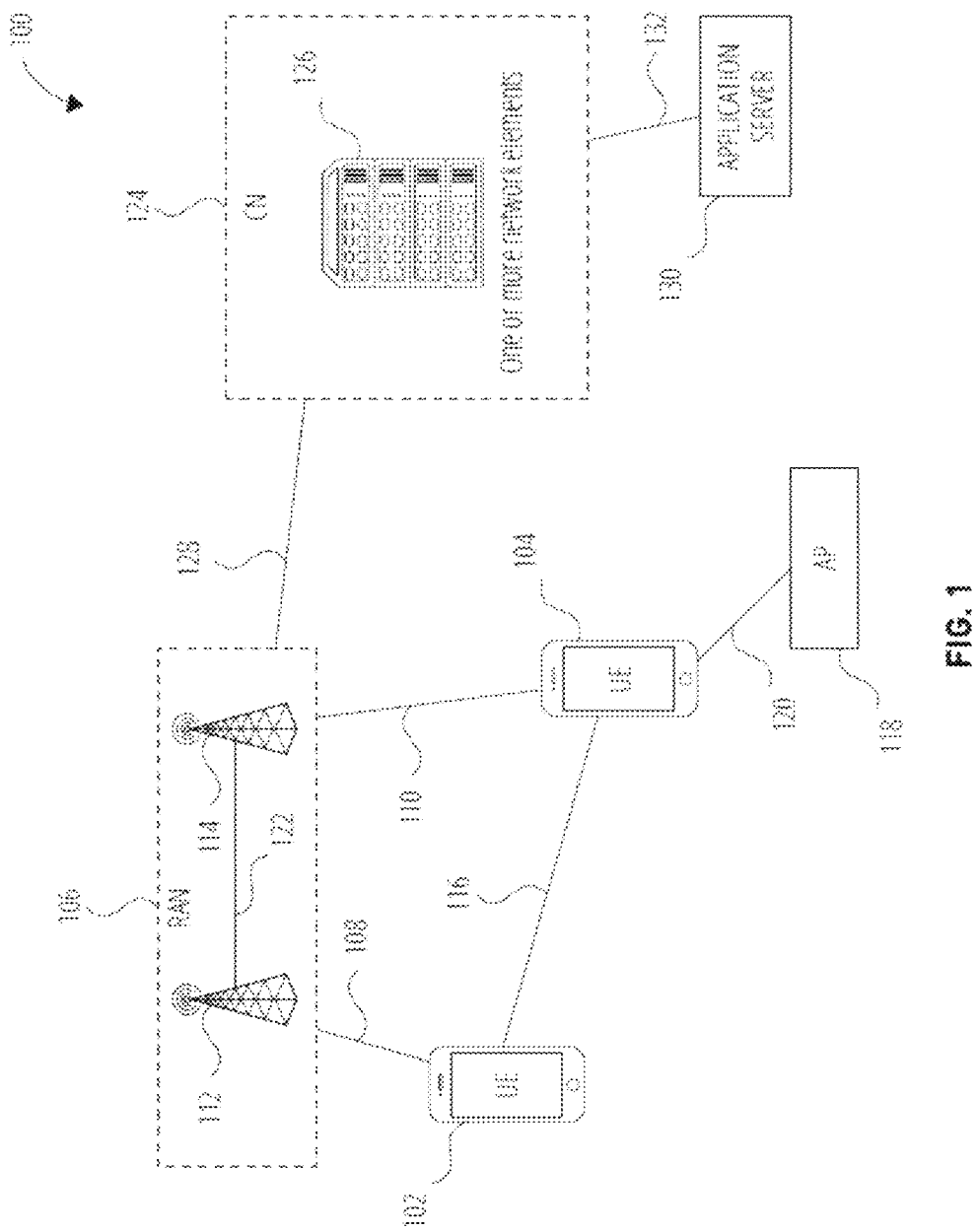
FIG. 1 illustrates an example architecture of a wireless communication system, according to embodiments disclosed herein.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, the wireless communication system 100 includes UE 102 and UE 104 (although any number of UEs may be used). In this example, the UE 102 and the UE 104 are illustrated as smartphones (e.g., handheld touchscreen mobile computing devices connectable to one or more cellular networks), but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112 and base station 114, that enable the connection 108 and connection 110.

In this example, the connection 108 and connection 110 are air interfaces to enable such communicative coupling, and may be consistent with RAT(s) used by the RAN 106, such as, for example, an LTE and/or NR.

In some embodiments, the UE 102 and UE 104 may also directly exchange communication data via a sidelink interface 116. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fi® router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 and/or the base station 114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 112 or base station 114 may be implemented as one or more software entities running on server computers as part of a virtual network. In addition, or in other embodiments, the base station 112 or base station 114 may be configured to communicate with one another via interface 122. In embodiments where the wireless communication system 100 is an LTE system (e.g., when the CN 124 is an EPC), the interface 122 may be an X2 interface. The X2 interface may be defined between two or more base stations (e.g., two or more eNBs and the like) that connect to an EPC, and/or between two eNBs connecting to the EPC. In embodiments where the wireless communication system 100 is an NR system (e.g., when CN 124 is a 5GC), the interface 122 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 124).

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface 128. In embodiments, the S1 interface 128 may be split into two parts, an S1 user plane (S1-U) interface, which carries traffic data between the base station 112 or base station 114 and a serving gateway (S-GW), and the S1-MME interface, which is a signaling interface between the base station 112 or base station 114 and mobility management entities (MMEs).

In embodiments, the CN 124 may be a 5GC, and the RAN 106 may be connected with the CN 124 via an NG interface 128. In embodiments, the NG interface 128 may be split into two parts, an NG user plane (NG-U) interface, which carries traffic data between the base station 112 or base station 114 and a user plane function (UPF), and the S1 control plane (NG-C) interface, which is a signaling interface between the base station 112 or base station 114 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

Figure 2:
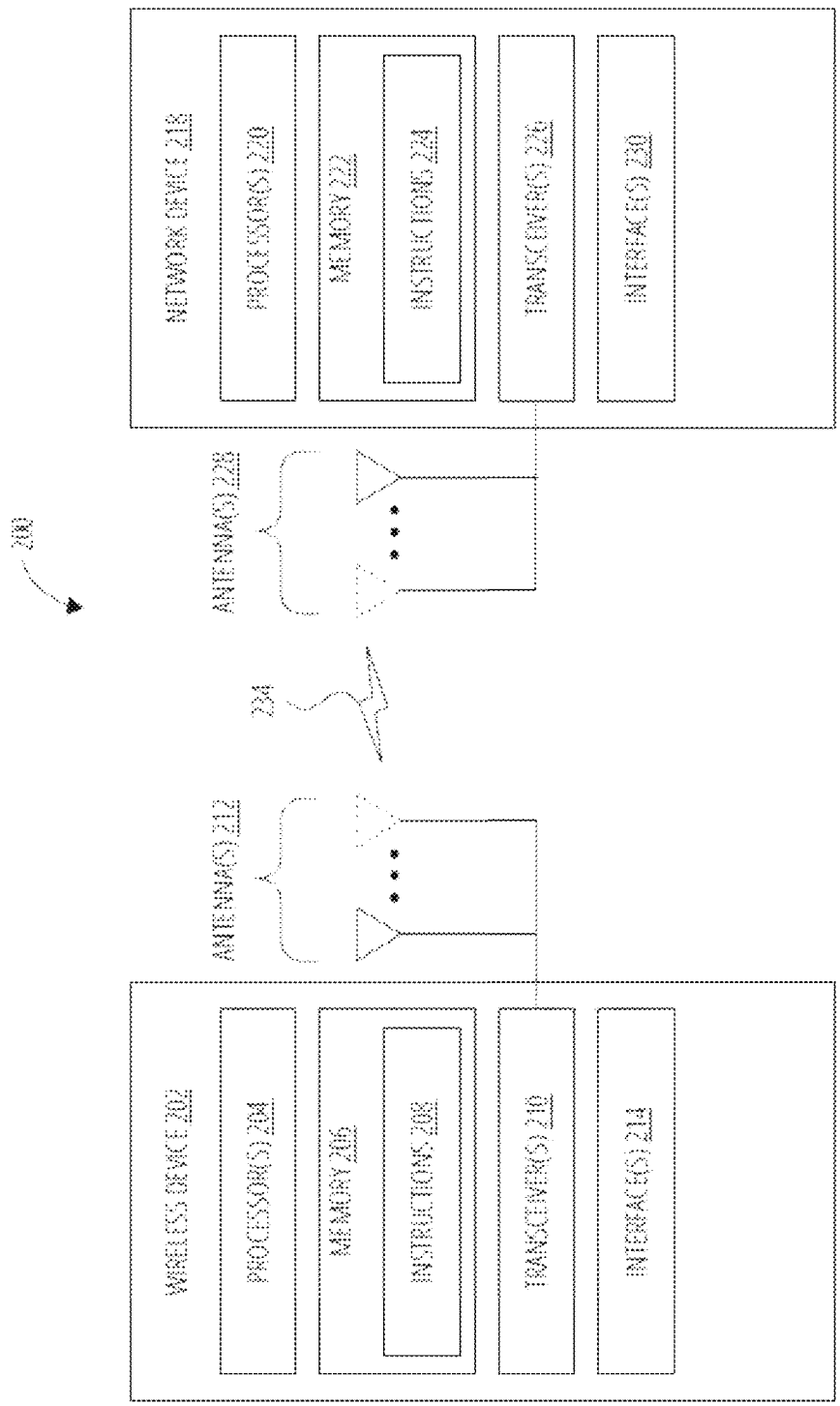
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a UE of a wireless communication system. The network device 218 may be, for example, a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touchscreen, buttons, and the like in order to allow for input and/or output to the UE by a user of the UE. Other interfaces of such a UE may be made up of made up of transmitters, receivers, and other circuitry (e.g., other than the transceiver(s) 210/antenna(s) 212 already described) that allow for communication between the UE and other devices and may operate according to known protocols (e.g., Wi-Fi®, Bluetooth®, and the like).

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230, The interface(s) 230 may be used to provide input to or output from the network device 218. For example, a network device 218 that is a base station may include interface(s) 230 made up of transmitters, receivers, and other circuitry (e.g., other than the transceiver(s) 226/antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

Figure 3:
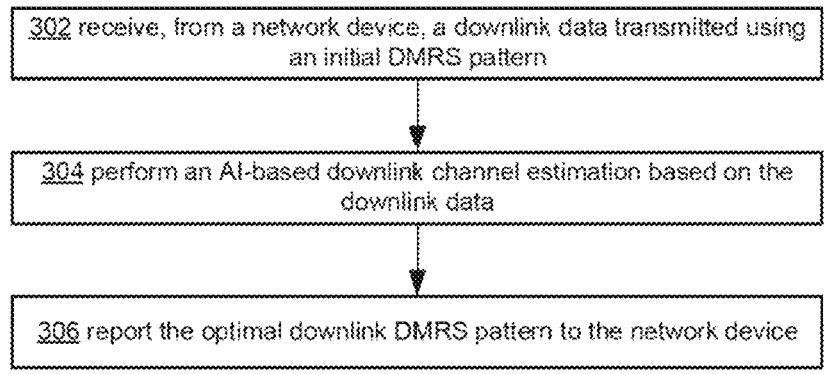
FIG. 3 illustrates a flowchart of an example method performed by a wireless device for downlink DMRS overhead adaptation with AI-based channel estimation, according to some embodiments disclosed herein.

FIG. 3 illustrates a flowchart of an example method 300 performed by a wireless device for downlink DMRS overhead adaptation with AI-based channel estimation, according to some embodiments disclosed herein. The wireless device may correspond to any of UEs 102, 104 described in FIG. 1 or the wireless device 202 described in FIG. 2.

In various embodiments, some of the elements of the methods shown may be performed concurrently, in a different order than shown, may be substituted for by other method elements, or may be omitted. Additional elements may also be performed as desired.

At step 302, the wireless device receives, from a network device, a downlink data transmitted using an initial DMRS pattern.

In some embodiments, the downlink data may include physical downlink shared channel (PDSCH) and/or physical downlink control channel (PDCCH). Further, the initial DMRS pattern may be any pattern used by the network device and indicated to the wireless device. For example, FIG. 6(a) shows an example of the initial DMRS pattern, in which the shaded resource elements labeled "1" in the resource block corresponds to the DMRS symbols, which constitute the DMRS pattern. It should be noted that the wording "initial" described herein only means to differentiate a currently used DMRS pattern with an optimal DMRS pattern after the AI-based downlink channel estimation, and has no other limitations for the DMRS pattern.

At step 304, the wireless device performs an AI-based downlink channel estimation based on the downlink data. A neural network model may be used for the AI-based downlink channel estimation. An input of the neural network model may be one or more DMRS symbols included in the downlink data (e.g., the six DMRS symbols in the resource block shown in FIG. 6(a)), and outputs of the neural network model may be an estimated downlink channel corresponding to the downlink data and an optimal downlink DMRS pattern for the estimated downlink channel.

The type of the neural network may be arbitrary, according to actual design requirements. For example, the neural network may be, but not limited to, Recurrent Neural Network (RNN), Long/Short Term Memory (LSTM), Convolutional Neural Network (CNN), Deep Neural Network (DNN).

At step 306, the wireless device reports the optimal downlink DMRS pattern to the network device.

According to method 300, downlink DMRS overhead adaptation with AI-based channel estimation is performed by the wireless device, to obtain an optimal downlink DMRS pattern for future transmission. The optimal downlink DMRS pattern may be optimal for obtaining a preferred channel estimation performance and/or achieving a preferred DMRS overhead reduction and/or achieving the best spectral efficiency for data transmission. The details of the downlink DMRS overhead adaptation with AI-based channel estimation will be further explained with reference to the signaling diagrams between the wireless device and the network device shown in FIGS. 4-5.

Figure 4:
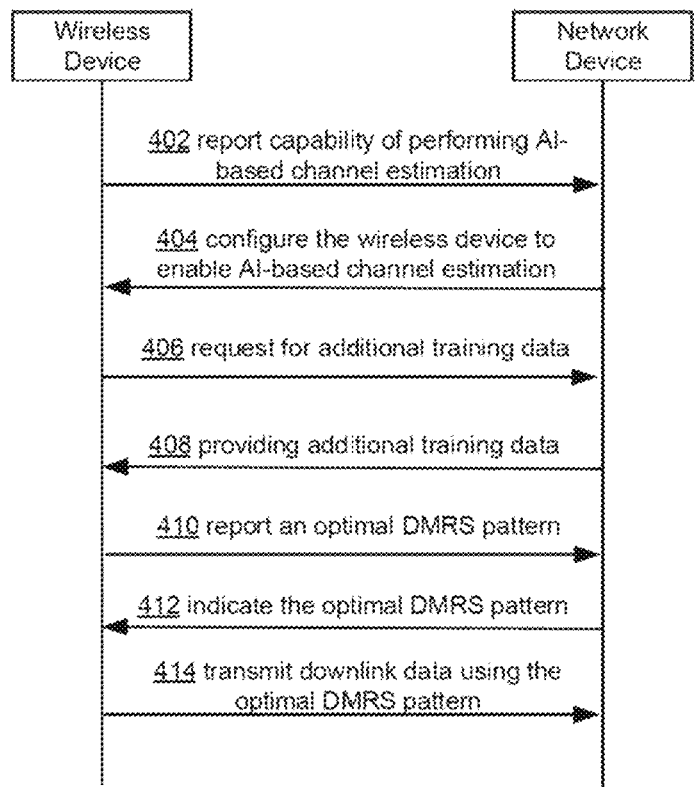
FIGS. 4-5 illustrate signaling diagrams of example methods for downlink DMRS overhead adaptation with AI-based channel estimation, according to some embodiments disclosed herein.
Figure 5:
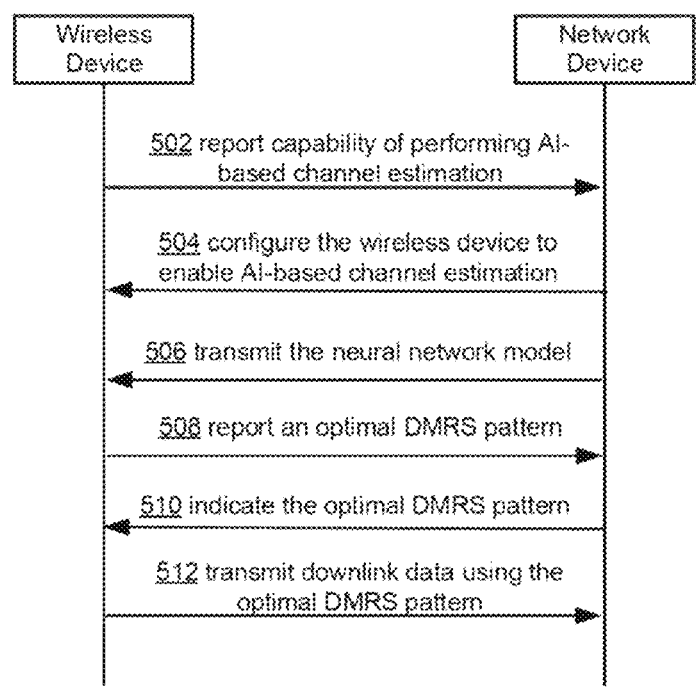

FIGS. 4-5 illustrate signaling diagrams of example methods for downlink DMRS overhead adaptation with AI-based channel estimation, according to some embodiments disclosed herein.

The wireless device shown in FIGS. 4-5 may correspond to the wireless device performing the method 300 described in FIG. 3, and the network device shown in FIGS. 4-5 may correspond to the network device communicating with the wireless device in FIG. 3.

Referring now to FIG. 4, in some embodiments, before performing the AI-based downlink channel estimation, such as performing method 300 described in FIG. 3, the wireless device may communicate with the network device for enabling the AI-based downlink channel estimation. This processing is illustrated in steps 402 and 404 of FIG. 4.

At step 402, the wireless device reports a capability of performing the AI-based downlink channel estimation to the network device. The capability may show that the wireless device supports DMRS overhead adaptation using AI-based estimation. In some embodiments, the wireless device may report the capability to the network device by using higher layer signaling such as radio resource control (RRC) signaling.

In some embodiments, the capability may include a capability to use a neural network model to perform AI-based downlink channel estimation. The capability may include a capability to evaluate and determine an optimal DMRS pattern using the neural network model. The capability may include a capability to report the optimal DMRS pattern to the network device. The capability may include a support of different DMRS patterns signaled by the network device. The wireless device may include one or more of the above capabilities. In addition, the wireless device may include further capabilities for supporting the DMRS overhead adaptation using AI-based estimation.

At step 404, the network device, in response to receiving the report of capability of wireless device in step 402, configures the wireless device to enable the AI-based channel estimation. Step 404 actions as a feedback for the capability from the network device.

In some embodiments, the network device may broadcast (e.g., in system information block (SIB)) to a plurality of wireless devices (e.g., the UEs in the cell controlled by a same gNB) that the network device supports the AI-based downlink channel estimation, so as to facilitate one or more wireless devices of the plurality wireless devices which have the capability of performing the AI-based downlink channel estimation to enable the AI-based downlink channel estimation.

In some embodiments, if a wireless device has the capability, it may enable the AI-based downlink channel estimation mode at its own. Alternatively, if a wireless device has the capability, it may decide whether to enable the mode. For example, the wireless device may decide whether to enable the mode based on an assessment on the channel estimation performance. As an example, when the channel characteristics falls into a set of characteristics in the training data used for training the neural network model, the wireless device may decide to enable the mode. Otherwise, the wireless device may decide not to enable the mode and the initial DMRS pattern would not be changed by the wireless device.

In some embodiments, in step 404, the network device may configure the wireless device to enable the AI-based downlink channel estimation using signaling specific to the wireless device, such as a UE-specific signaling (e.g., higher layer signaling such as RRC signaling).

In some situations, the AI-based channel estimation may be completely up to the wireless device implementation, and the network device has no knowledge on the detailed structure or algorithms of the block implemented on the wireless device for performing the AI-based channel estimation.

In these situations, the neural network model may be trained by the wireless device. The training data used for training the neural network model may include one or more predefined downlink DMRS patterns and one or more known downlink channels. Based on the training data, known DMRS symbols, which are the input to the neural network model, may be generated. Further, the known downlink channels may be used as a ground truth for training the neural network model.

In some embodiments, the known downlink channels may be obtained by using some channel models. Alternatively, the known downlink channels may be obtained from a field measurement.

In some embodiments, the training data may be generated by the wireless device. In some other embodiments, the training data may be provided from the network device to the wireless device, e.g. through air interface. In addition, the training data may further include decision-feedback data which is decoded by the wireless device from the received downlink data. For example, after decoding of a PDSCH, the decoded data of the PDSCH becomes known symbols to the wireless device. The decoded data may be used as the decision-feedback data to further train the neural network model. By doing so, the neural network model may be trained and adjusted in real time, which may save data transmission overhead for training data from the network device to the wireless device.

In some embodiments, the neural network model may be trained so as to improve the channel estimation performance and/or decrease the DMRS overhead.

Generally, the more the DMRS symbols are transmitted, the better the channel estimation performance would be. In contrast, the more the DMRS symbols are transmitted, the more the DMRS overhead (e.g., the ratio of the DMRS symbols in a PDSCH and the total data in the PDSCH) would be. Therefore, there is a tradeoff between the channel estimation performance and the DMRS overhead. By taking into account the tradeoff, the neural network model may be trained to take care of both the channel estimation performance and the DMRS overhead, so as to achieve an optimized DMRS overhead adaptation with AI-based channel estimation. In some embodiments, a certain metric (e.g. related to the information bit quality) can be developed, and the neural network model may be trained to minimize or maximize the metric to achieve the tradeoff.

In some embodiments, the above two conditions, i.e., the channel estimation performance and the optimal DMRS pattern, may be considered separately. For example, for the channel estimation and the optimal DMRS pattern, two separate neural network models may be used. The neural network model for channel estimation may be trained using the training data so that the estimated channel may be as similar as possible to the known channel used as ground truth. Further, the neural network model for optimal DMRS pattern may be trained using the training data including a pre-known optimal DMRS pattern, so that the neural network model would output an optimal DMRS pattern as close as possible to the pre-known optimal DMRS pattern.

In some embodiments, the optimal DMRS pattern, as an output of the neural network model, may be out of multiple pre-defined DMRS patterns. For example, the neural network model may be trained so that an optimal DMRS pattern may be selected from the multiple pre-defined DMRS patterns. In some embodiments, a DMRS pattern can span across one or more slots. In addition, the DMRS overhead can vary from slot to slot. In some embodiments, the DMRS overhead can be different in spatial domain for different antenna ports.

In some embodiments, in addition to the initial training data used for training the neural network model, additional training data may be necessary for the wireless device to refine the neural network model. This processing is illustrated in steps 406 and 408 of FIG. 4.

At step 406, the wireless device requests the network device to provide additional training data for training the neural network model.

In some embodiments, the wireless device may determine, based on an assessment on the channel estimation performance, whether to request for the additional training data. The assessment may be based on a Doppler estimate, a velocity of the wireless device, a sudden change in channel characteristics, etc.

At step 408, the network device provides the additional training data to the wireless device for training the neural network model.

In some embodiments, step 408 may be performed in response to the request of the wireless device in step 406. In these embodiments, before step 406, the network device may indicate the capability to provide additional training data via either broadcast or UE-specific signaling.

In some other embodiments, in step 408, the network device may provide the additional training data to the wireless device based on its own criteria. For example, the network device may provide the additional training data periodically or based on channel characteristics (e.g., the network device detects significant change in channel characteristics). In these embodiments, step 406 may be omitted.

In some embodiments, the network device may indicate, to the wireless device, the additional training data in downlink Control information (DCI). For example, the network device may indicate in the DCI whether the transmission (e.g., the PDSCH) includes the training data. Alternatively, the network device may semi-statically configure (e.g., through RRC signaling) the transmission timing of the additional training data, e.g., when there will be training data transmitted to the wireless device.

Figure 6:
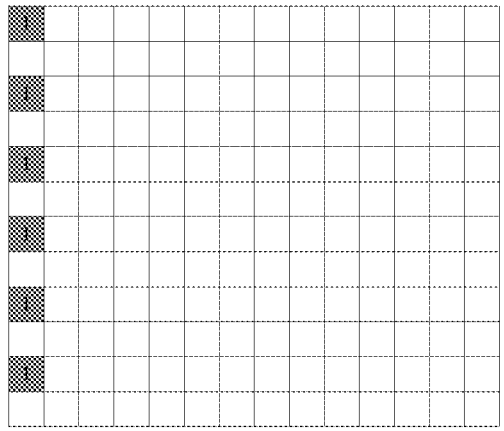
FIG. 6 illustrates example DMRS patterns used for training the neural network model, according to some embodiments disclosed herein.
Figure 6:
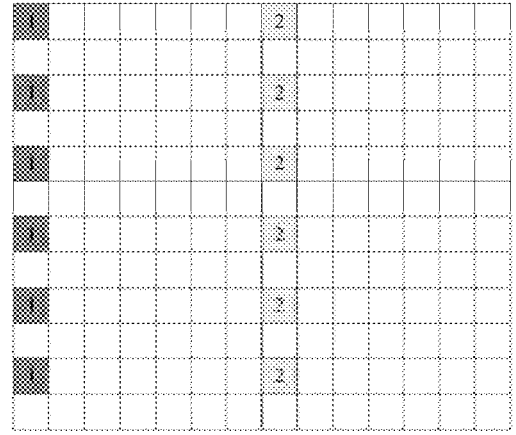
Figure 6:
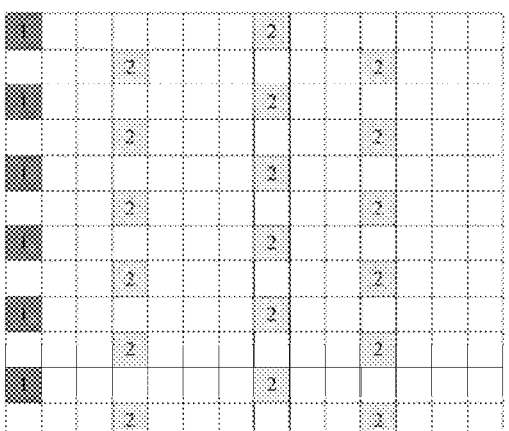
Figure 6:
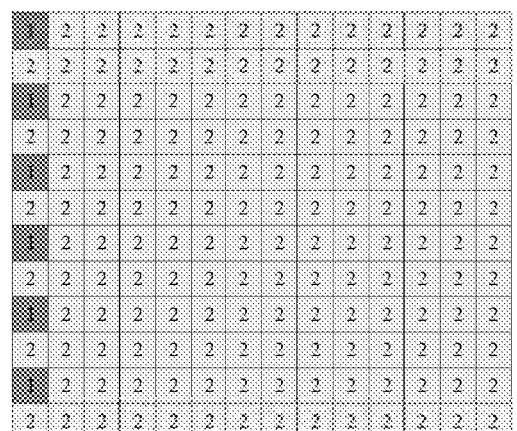

In some embodiments, the additional training data provided by the network device may include at least one of additional downlink data including symbols which are known to the wireless device in addition to the DMRS symbols included in the downlink data, or additional downlink data using a DMRS pattern that includes more DMRS symbols than the DMRS symbols included in the received downlink data. With reference to FIG. 6, some examples of the additional training data may be explained.

FIG. 6 illustrates example DMRS patterns used for training the neural network model, according to some embodiments disclosed herein. Each of FIGS. 6(*a*)-(*d*) represents a resource block, and the shaded resource elements labeled "1" in the resource blocks correspond to the DMRS symbols, which constitute the DMRS pattern.

FIG. 6(*a*) shows an initial DMRS pattern using which the downlink data is transmitted. FIGS. 6(*b*)-(*d*) shows resource blocks in which additional known symbols are included. In FIG. 6(*b*), the shaded resource elements labeled "2" in the resource block correspond to symbols which are known to the wireless device in addition to the DMRS symbols labeled "1". Similarly, in FIG. 6(*c*), more know symbols labeled "2" are set in the resource elements. Further, in FIG. 6(*d*), in addition to the DMRS symbols labeled "1", all other symbols in the resource block are set to be the known symbols. By providing more known symbols as additional training data to the wireless device, the wireless device may obtain more information for training to refine the neural network model.

[SS] In some embodiments, the known symbols labeled "2" may also be DMRS symbols. For example, in FIGS. 6(*b*)-(*d*), compared to FIG. 6(*a*) with the initial DMRS pattern, denser DMRS patterns are used as training data patterns. Alternatively, other symbols known by the wireless device may be used as the known symbols in the additional training data. Further, it should be noted that the training data patterns in the present disclosure are not limited to the patterns shown in FIGS. 6 (*b*)-(*d*), and may be designed according to actual needs.

In some embodiments, the network device may dynamically indicate (e.g, in DCI) which type of additional training data (e.g., the training data pattern shown in FIGS. 6 (*b*)-(*d*)) is to be transmitted to the wireless device.

Referring back to FIG. 4, at step 410, the wireless device reports an optimal downlink DMRS pattern, which is obtained from the trained neural network model, to the network device. The processing for obtaining an optimal downlink DMRS pattern from the neural network model has been described in method 300 of FIG. 3.

At step 412, the network device indicates the optimal DMRS pattern as a new DMRS pattern to the wireless device. In some embodiments, the network device sends a signaling to the wireless device to change the DMRS pattern from the initial DMRS pattern to the new DMRS pattern. The signaling may be dynamic (e.g. through DCI) or semi-static (e.g., through RRC signaling or MAC CE (multimedia access control control element)). In some other embodiments, the wireless device may request for change in DMRS pattern and the network device may follow the request by providing an acknowledgement to the wireless device and start to use the new DMRS pattern after a predefined application delay.

At step 414, the network device transmits downlink data using the optimal DMRS pattern.

The above-described FIG. 4 illustrates a signaling diagram of an example method for downlink DMRS overhead adaptation with AI-based channel estimation, in which the neural network model is trained at the wireless device. In some situations, considering that the network device usually may have stronger computing capability, the neural network model may be trained at the network device and be provided to the wireless device. These embodiments may be described with reference to FIG. 5.

FIG. 5 illustrates a signaling diagram of an example method for downlink DMRS overhead adaptation with AI-based channel estimation, according to some embodiments disclosed herein. The difference between FIGS. 4 and 5 lies in step 506, other steps 502, 504, 508-512 correspond to steps 402, 404, 410-414 respectively, and the description thereof would be omitted.

In the method of FIG. 5, the neural network model is trained by the network device. The training process may be similar to that performed in the wireless device described with reference to FIG. 4. After training, at step 506, the network device transmits the trained neural network model for downloading by the wireless device.

In some embodiments, the network device may transmit the following information of the neural network model to the wireless device, including one or more of: the type of the neural network, the number of layers, input and output, the parameters used in the neural network (e.g., weights and bias). The wireless device may download the information of the neural network to reconstruct the neural network model at its own side. In some embodiments, some of the above-mentioned information may be predefined or unified at both sides of the wireless device and the network device. In this case, the wireless device may download less information from the network device.

In some embodiments, the wireless device may download the neural network model from the network device via broadcast (e.g., SIB) or UE-specific signaling (e.g., RRC signaling), and starts to use the neural network model for performing the above-described AI-based channel estimation.

In some embodiments, although the neural network model is trained and provided by the network device, the neural network model may be further trained by the wireless device using the training data, to update the neural network model. In addition, the wireless device may request for additional training data from the network device to further refine the neural network model. The updated neural network model may be feedback to the network device. Moreover, the network device may further train the updated neural network model. By doing so, the neural network model may be trained at both sides of the wireless device and the network device to achieve a better performance.

Embodiments contemplated herein include an apparatus comprising means to perform one or more elements of the method 300. This apparatus may be, for example, an apparatus of a UE (such as a wireless device 202 that is a UE, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a UE (such as a memory 206 of a wireless device 202 that is a UE, as described herein).

Embodiments contemplated herein include an apparatus comprising logic, modules, or circuitry to perform one or more elements of the method 300. This apparatus may be, for example, an apparatus of a UE (such as a wireless device 202 that is a UE, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a UE (such as a wireless device 202 that is a UE, as described herein).

Embodiments contemplated herein include a signal as described in or related to one or more elements of the method 300.

Embodiments contemplated herein include a computer program or computer program product comprising instructions, wherein execution of the program by a processor is to cause the processor to carry out one or more elements of the method 300. The processor may be a processor of a UE (such as a processor(s) 204 of a wireless device 202 that is a UE, as described herein). These instructions may be, for example, located in the processor and/or on a memory of the UE (such as a memory 206 of a wireless device 202 that is a UE, as described herein).

Figure 7:
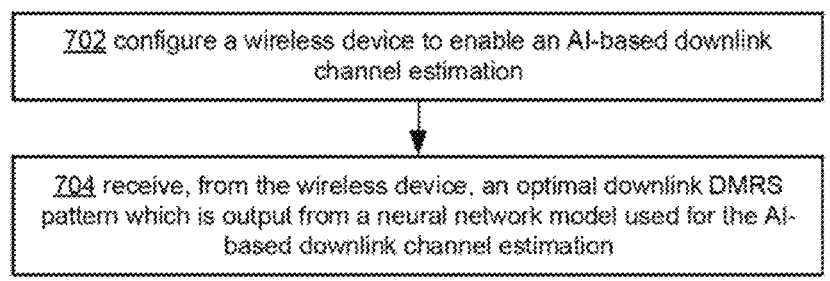
FIG. 7 illustrates a flowchart of an example method performed by a network device for downlink DMRS overhead adaptation with AI-based channel estimation, according to some embodiments disclosed herein.

FIG. 7 illustrates a flowchart of an example method 700 performed by a network device for downlink DMRS overhead adaptation with AI-based channel estimation, according to some embodiments disclosed herein. The network device may correspond to any of base stations 112, 114 described in FIG. 1 or the network device 218 described in FIG. 2.

At step 702, the network device configures a wireless device to enable an AI-based downlink channel estimation.

At step 704, the network device receives, from the wireless device, an optimal downlink DMRS pattern which is output from a neural network model used for the AI-based downlink channel estimation.

The processing in steps 702 and 704 corresponds to steps 404 and 410 of FIG. 4, and the details would be omitted here.

The above FIGS. 3-5 and 7 illustrate the methods and signaling diagrams for downlink DMRS overhead adaptation with AI-based channel estimation. Next, an uplink DMRS overhead adaptation with AI-based channel estimation will be described with reference to FIG. 8.

Figure 8:
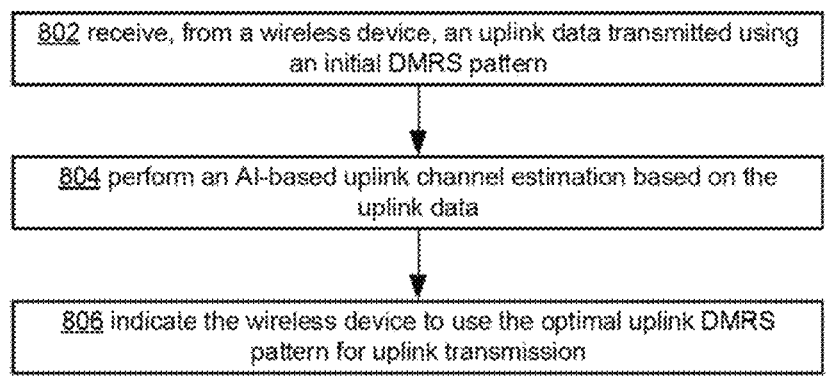
FIG. 8 illustrates a flowchart of an example method performed by a network device for uplink DMRS overhead adaptation with AI-based channel estimation, according to some embodiments disclosed herein.

FIG. 8 illustrates a flowchart of an example method 800 performed by a network device for uplink DMRS overhead adaptation with AI-based channel estimation, according to some embodiments disclosed herein. The network device may correspond to any of base stations 112, 114 described in FIG. 1 or the network device 218 described in FIG. 2.

At step 802, the network device receives, from a wireless device, an uplink data transmitted using an initial DMRS pattern.

In some embodiments, the uplink data may include physical uplink shared channel (PUSCH) and/or physical uplink control channel (PUCCH), Further, the initial DMRS pattern may be any pattern used by the network device and indicated to the wireless device. For example, FIG. 6(*a*) shows an example of the initial DMRS pattern, in which the shaded resource elements labeled "1" in the resource block corresponds to the DMRS symbols, which constitute the DMRS pattern.

At step 804, the network device performs an AI-based uplink channel estimation based on the uplink data. A neural network model may be used for the AI-based uplink channel estimation. An input of the neural network model may be one or more DMRS symbols included in the uplink data, and outputs of the neural network model may be an estimated uplink channel corresponding to the uplink data and an optimal uplink DMRS pattern for the estimated uplink channel.

The type of the neural network may be arbitrary, according to actual design requirements. For example, the neural network may be, but not limited to, Recurrent Neural Network (RNN), Long/Short Term Memory (LSTM), Convolutional Neural Network (CNN), Deep Neural Network (DNN).

At step 806, the network device indicates the wireless device to use the optimal uplink DMRS pattern for uplink transmission. In some embodiments, the network device sends a signaling to the wireless device to change the DMRS pattern from the initial DMRS pattern to the new DMRS pattern. The signaling may be dynamic (e.g. through DCI) or semi-static (e.g., through RRC signaling or MAC CE). In some other embodiments, the wireless device may apply the new DMRS pattern after a predefined application delay.

In some embodiments, the network device may configure the wireless device to enable DMRS pattern adaptation for uplink transmission, in response to receiving, from the wireless device, a report of a capability of supporting DMRS pattern adaptation for uplink transmission.

In some embodiments, the neural network model may be trained based on training data including one or more predefined uplink DMRS patterns and one or more known uplink channels. The known uplink channels may be obtained by using some channel models.

In some embodiments, the training data may be generated by the network device. In addition, the training data may further include decision-feedback data which is decoded by the network device from the received uplink data. For example, after decoding of a PUSCH, the decoded data of the PUSCH becomes known symbols to the network device. The decoded data may be used as the decision-feedback data to further train the neural network model. By doing so, the neural network model may be trained and adjusted in real time.

In some embodiments, by using the training data, the neural network model may be trained so as to improve the channel estimation performance and/or decrease the DMRS overhead.

Similarly as described with reference to the case for downlink channel estimation, there may be a tradeoff between the channel estimation performance and the DMRS overhead. By taking into account the tradeoff, the neural network model may be trained to take care of both the channel estimation performance and the DMRS overhead, so as to achieve an optimized DMRS overhead adaptation with AI-based channel estimation.

Alternatively, in some embodiments, the above two conditions, i.e., the channel estimation performance and the optimal DMRS pattern, may be considered separately. For example, for the channel estimation and the optimal DMRS pattern, two separate neural network models may be used. The neural network model for channel estimation may be trained using the training data so that the estimated channel may be as similar as possible to the known channel used as ground truth. Further, the neural network model for optimal DMRS pattern may be trained using the training data including a pre-known optimal DMRS pattern, so that the neural network model would output an optimal DMRS pattern as close as possible to the pre-known optimal DMRS pattern.

In some embodiments, the neural network model for the AI-based uplink channel estimation, which is trained by the network device, may be provided to the wireless device for performing AI-based downlink channel estimation. This would especially work if the same waveform (e.g. CP-OFDM (Circular Prefix-OFDM)) and the same DMRS patterns are used in downlink and uplink.

For TDD (Time Division Duplex), there is channel reciprocity between downlink and uplink. Therefore, the neural network model trained for uplink at the network device can be readily used for downlink at the wireless device.

For FDD (Frequency Division Duplex), even though there is no channel reciprocity, many channel characteristics are still similar between downlink and uplink. For example, if the neural network model trained for uplink can be applicable to a wide range of SINR values, it can potentially be used for downlink as well.

In these embodiments, since the neural network model trained by the network device for uplink is directly provided to the wireless device for performing AI-based downlink channel estimation, the overhead for training the neural network model for downlink at either the wireless device or the network device may be saved while the performance may be maintained.

Embodiments contemplated herein include an apparatus comprising means to perform one or more elements of the method 700/800. This apparatus may be, for example, an apparatus of a base station (such as a network device 218 that is a base station, as described herein).

Embodiments contemplated herein include one or more non-transitory computer-readable media comprising instructions to cause an electronic device, upon execution of the instructions by one or more processors of the electronic device, to perform one or more elements of the method 700/800. This non-transitory computer-readable media may be, for example, a memory of a base station (such as a memory 222 of a network device 218 that is a base station, as described herein).

Embodiments contemplated herein include an apparatus comprising logic, modules, or circuitry to perform one or more elements of the method 700/800. This apparatus may be, for example, an apparatus of a base station (such as a network device 218 that is a base station, as described herein).

Embodiments contemplated herein include an apparatus comprising: one or more processors and one or more computer-readable media comprising instructions that, when executed by the one or more processors, cause the one or more processors to perform one or more elements of the method 700/800. This apparatus may be, for example, an apparatus of a base station (such as a network device 218 that is a base station, as described herein).

Embodiments contemplated herein include a signal as described in or related to one or more elements of the method 700/800.

Embodiments contemplated herein include a computer program or computer program product comprising instructions, wherein execution of the program by a processing element is to cause the processing element to carry out one or more elements of the method 700/800. The processor may be a processor of a base station (such as a processor(s) 220 of a network device 218 that is a base station, as described herein). These instructions may be, for example, located in the processor and/or on a memory of the UE (such as a memory 222 of a network device 218 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A wireless device, comprising:
a memory, in which instructions are stored; and
at least one processor, configured to execute the instructions stored in the memory to:
receive, from a network device, a downlink data transmitted using a downlink demodulation reference signal (DMRS) pattern;
perform an artificial intelligence (AI)-based downlink channel estimation based on the downlink data, including:
inputting one or more received downlink DMRS symbols included in the downlink data to a neural network model for downlink channel estimation stored in the memory of the wireless device, to obtain, as outputs of the neural network model, an estimated downlink channel corresponding to the downlink data and an optimal downlink DMRS pattern for the estimated downlink channel; and
report the optimal downlink DMRS pattern to the network device.

2. The wireless device of claim 1, wherein the at least one processor is further configured to execute the instructions stored in the memory to:
report a capability of performing the AI-based downlink channel estimation to the network device; and
enable the AI-based channel estimation based on a feedback for the capability from the network device.

3. The wireless device of claim 1, wherein the neural network model is trained by the wireless device based on training data including one or more predefined downlink DMRS patterns and one or more known downlink channels so as to improve the channel estimation performance and decrease DMRS overhead.

4. The wireless device of claim 3, wherein the training data further includes decision-feedback data which is decoded by the wireless device from the downlink data.

5. The wireless device of claim 3, wherein the at least one processor is further configured to execute the instructions stored in the memory to request the network device to provide additional training data for training the neural network model.

6. The wireless device of claim 5, wherein the at least one processor is further configured to execute the instructions stored in the memory to determine, based on an assessment on the channel estimation performance, whether to request for the additional training data.

7. The wireless device of claim 5, wherein the additional training data includes at least one of additional downlink data including symbols which are known to the wireless device in addition to the DMRS symbols included in the downlink data, or the additional downlink data using a DMRS pattern that includes more DMRS symbols than the DMRS symbols included in the downlink data.

8. The wireless device of claim 1, wherein the neural network model is trained by the network device based on training data including one or more predefined downlink DMRS patterns and one or more known downlink channels so as to improve the channel estimation performance and decrease DMRS overhead, and
wherein the at least one processor is further configured to execute the instructions stored in the memory to download the neural network model from the network device.

9. The wireless device of claim 8, wherein the at least one processor is further configured to execute the instructions stored in the memory to:
further train the neural network model using the training data to update the neural network model; and
feedback the updated neural network model to the network device.

10. The wireless device of claim 1, wherein the downlink data includes at least one of a physical downlink shared channel (PDSCH) and a physical downlink control channel (PDCCH).

11. A network device, comprising:
a memory, in which instructions are stored; and
at least one processor, configured to execute the instructions stored in the memory to:
configure a wireless device to enable an artificial intelligence (AI)-based downlink channel estimation; and
receive, from the wireless device, an optimal downlink DMRS pattern which is output from a neural network model used for the AI-based downlink channel estimation,
wherein the neural network model has an input of received downlink DMRS symbols included in a downlink data received by the wireless device and outputs of estimated downlink channel corresponding to the downlink data and an optimal downlink DMRS pattern for the estimated downlink channel.

12. The network device of claim 11, wherein the neural network model is trained by the wireless device based on training data including one or more predefined downlink DMRS patterns and one or more known downlink channels so as to improve the channel estimation performance and decrease DMRS overhead, and
wherein the at least one processor is further configured to execute the instructions stored in the memory to provide additional training data to the wireless device for training the neural network model periodically or based on channel characteristics.

13. The network device of claim 11, wherein the neural network model is trained by the wireless device based on training data including one or more predefined downlink DMRS patterns and one or more known downlink channels so as to improve the channel estimation performance and decrease DMRS overhead, and
wherein the at least one processor is further configured to execute the instructions stored in the memory to:
indicate, to the wireless device, a capability to provide additional training data; and
provide the additional training data to the wireless device in response to a request from the wireless device.

14. The wireless device of claim 13, wherein the at least one processor is further configured to execute the instructions stored in the memory to indicate, to the wireless device, the additional training data in downlink Control information (DCI).

15. The wireless device of claim 13, wherein the at least one processor is further configured to execute the instructions stored in the memory to semi-statically configure the transmission timing of the additional training data.

16. The wireless device of claim 13, wherein the additional training data includes at least one of additional downlink data including symbols which are known to the wireless device in addition to the DMRS symbols included in the downlink data, or the additional downlink data using a DMRS pattern that includes more DMRS symbols than the DMRS symbols included in the downlink data.

17. The network device of claim 11, wherein the neural network model is trained by the network device based on training data including one or more predefined downlink DMRS patterns and one or more known downlink channels so as to improve the channel estimation performance and decrease DMRS overhead, and wherein the at least one processor is further configured to execute the instructions stored in the memory to provide the neural network model to the wireless device.

18. The network device of claim 17, wherein the at least one processor is further configured to execute the instructions stored in the memory to receive, from the wireless device, an updated neural network model which is further trained by the wireless device.

19. The network device of claim 11, wherein the at least one processor is further configured to execute the instructions stored in the memory to broadcast to a plurality of wireless devices that the network device supports the AI-based downlink channel estimation, so as to facilitate one or more wireless devices of the plurality wireless devices which have a capability of performing the AI-based downlink channel estimation to enable the AI-based downlink channel estimation.

20. The network device of claim 11, wherein the at least one processor is further configured to execute the instructions stored in the memory to configure the wireless device to enable the AI-based downlink channel estimation using signaling specific to the wireless device, in response to receiving a report from the wireless device of a capability of performing the AI-based downlink channel estimation.

* * * * *